United States Patent
Yao et al.

(10) Patent No.: US 12,513,226 B2
(45) Date of Patent: Dec. 30, 2025

(54) METHOD FOR TRANSMISSION OF COMPUTING POWER ANNOUNCEMENT, AND COMPUTING POWER NETWORK ELEMENT NODE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Huijuan Yao, Beijing (CN); Yuexia Fu, Beijing (CN); Tao Sun, Beijing (CN); Lu Lu, Beijing (CN)

(73) Assignee: China Mobile Communication Co., Ltd Research Institute, Beijing (CN)

( * ) Notice: Subject to any disclaimer, the term of this patent is extended or adjusted under 35 U.S.C. 154(b) by 75 days.

(21) Appl. No.: 18/575,866

(22) PCT Filed: Jun. 29, 2022

(86) PCT No.: PCT/CN2022/102298
§ 371 (c)(1),
(2) Date: Jan. 1, 2024

(87) PCT Pub. No.: WO2023/274293
PCT Pub. Date: Jan. 5, 2023

(65) Prior Publication Data
US 2025/0106305 A1  Mar. 27, 2025

(30) Foreign Application Priority Data
Jul. 2, 2021  (CN) .......................... 202110750298.8

(51) Int. Cl.
*H04L 67/63* (2022.01)
*H04L 45/02* (2022.01)

(52) U.S. Cl.
CPC .............. *H04L 67/63* (2022.05); *H04L 45/04* (2013.01)

(58) Field of Classification Search
CPC ....... H04L 67/10; H04L 67/51; G06F 9/5072; G06F 9/5005; G06F 9/5027
See application file for complete search history.

(56) References Cited

U.S. PATENT DOCUMENTS

| | | | | |
|---|---|---|---|---|
| 2010/0124196 A1* | 5/2010 | Bonar | ................. | H04B 7/0689 455/445 |
| 2015/0172903 A1* | 6/2015 | Sun | ....................... | H04W 8/005 370/312 |

(Continued)

FOREIGN PATENT DOCUMENTS

| | | |
|---|---|---|
| CN | 110782343 A | 2/2020 |
| CN | 110851529 A | 2/2020 |

(Continued)

OTHER PUBLICATIONS

ISR for PCT application PCT/CN2022/102298.

(Continued)

*Primary Examiner* — David R Lazaro
(74) *Attorney, Agent, or Firm* — Maginot, Moore & Beck (57) ABSTRACT

A method for transmission of computing power announcement is performed by a first computing power network element node. The method comprises: sending computing power announcement information of a target computing node to a second computing network element node, wherein the computing power announcement information comprises at least one of the following: first field information used for recording computing service capability information of the target computing node; second field information used for recording a computing resource state of the target computing (Continued)

--- sending computing power announcement information of a target computing node to a second computing network element node; the computing power announcement information includes at least one of first field information for recording computing service capability information of the target computing node; second field information for recording a computing resource state of the target computing node; or third field information for recording a computing service state of the target computing node

S210 node; and third field information used for recording a computing service state of the target computing node.

14 Claims, 4 Drawing Sheets

(56) References Cited

U.S. PATENT DOCUMENTS

| | | | | |
|---|---|---|---|---|
| 2015/0222678 | A1* | 8/2015 | Zhang | H04N 21/2181 |
| | | | | 709/219 |
| 2016/0142336 | A1* | 5/2016 | Udupi | H04L 67/63 |
| | | | | 709/226 |
| 2016/0352782 | A1* | 12/2016 | Patil | H04W 8/005 |
| 2016/0352842 | A1* | 12/2016 | Patil | H04L 67/59 |
| 2017/0064612 | A1* | 3/2017 | Bajko | H04W 72/29 |
| 2017/0300363 | A1* | 10/2017 | Liu | G06F 9/5083 |
| 2018/0091420 | A1* | 3/2018 | Drake | H04L 45/033 |
| 2018/0103356 | A1* | 4/2018 | Wang | H04W 76/40 |
| 2018/0176009 | A1* | 6/2018 | Agerstam | H04L 63/18 |
| 2019/0141486 | A1* | 5/2019 | Lu | H04W 8/22 |
| 2019/0190789 | A1* | 6/2019 | Zhang | G06F 9/5044 |
| 2019/0320407 | A1* | 10/2019 | Goyal | H04L 41/5058 |
| 2021/0235255 | A1* | 7/2021 | Ansari | H04W 76/14 |
| 2022/0239758 | A1* | 7/2022 | Klein | G06N 20/00 |
| 2023/0269164 | A1* | 8/2023 | Zheng | H04L 45/124 |
| | | | | 370/254 |
| 2024/0048477 | A1* | 2/2024 | Xu | H04W 4/50 |
| 2024/0187339 | A1* | 6/2024 | Huang | H04L 67/63 |
| 2025/0106305 | A1* | 3/2025 | Yao | H04L 45/04 |

FOREIGN PATENT DOCUMENTS

| | | |
|---|---|---|
| CN | 111510383 A | 8/2020 |
| CN | 112465359 A | 3/2021 |
| CN | 112491716 A | 3/2021 |
| CN | 112751826 A | 5/2021 |
| WO | 2020156110 A1 | 8/2020 |

OTHER PUBLICATIONS

English translation of ISR for PCT application PCT/CN2022/102298.

Huang, et al., Analysis of Computation Network Architecture and According Scenarios, Information and Communication Technologies, 2020, pp. 16-22 (8 pages).

Office Action for corresponding CN application 202110750298.8, mailed Dec. 28, 2024, English and Chinese language translations (12 pages).

Search Report for corresponding EP application 22832105.5, mailed May 26, 2025 (9 pages).

* cited by examiner

FIG. 1 sending computing power announcement information of a
target computing node to a second computing network element
node; the computing power announcement information includes at
least one of first field information for recording computing service
capability information of the target computing node; second field
information for recording a computing resource state of the target
computing node; or third field information for recording a
computing service state of the target computing node

FIG. 5 receiving computing power announcement information of a target computing node sent by a first computing network element node; the computing power announcement information includes at least one of: first field information for recording computing service capability information of the target computing node; second field information for recording a computing resource state of the target computing node; or third field information for recording a computing service state of the target computing node — S610

METHOD FOR TRANSMISSION OF COMPUTING POWER ANNOUNCEMENT, AND COMPUTING POWER NETWORK ELEMENT NODE

CROSS-REFERENCE TO RELATED APPLICATIONS

This disclosure is the U.S. National Stage Application of International Application No. PCT/CN2022/102298, filed on Jun. 29, 2022, which is based on and claims priority to Chinese Patent Application No. 202110750298.8, filed on Jul. 2, 2021 in China, the entire contents of which are incorporated herein by reference.

TECHNICAL FIELD

The disclosure relates to a field of a data communication network, and particularly to a method for transmission of a computing power announcement and a computing network element node.

BACKGROUND

With the development of cloud computing and edge computing, there may be different scales of computing power distributed at different distances close to a user in the future society, and various personalized services are provided for the user via a global network. A sea of ubiquitous computing power is formed from a hundreds-of-millions-level smart terminal, to a global billion-level home gateway, to thousands of edge clouds with a computing capability brought by future edge computing in each city, to tens of large cloud data centers (DCs) in each country, which accesses the Internet from various places, and forms a development trend that the computing is deeply fused with the network.

Computing resources in the network are fused into each corner of the network, so that each network node may become a provider of the recourses, and a request from the user may be satisfied by calling the nearest node resources, which is no longer limited to a specific node, thereby avoiding waste of connection and network scheduling resources.

In a network system based on computing power processing, different protocols and manners cannot be adaptively selected to announce information in the network, thereby causing a large number of announcement overheads in the network.

SUMMARY

A method for transmission of a computing power announcement is provided in the disclosure, which is performed by a first computing network element node. The method includes:
sending computing power announcement information of a target computing node to a second computing network element node;
in which the computing power announcement information includes at least one of:
first field information for recording computing service capability information of the target computing node;
second field information for recording a computing resource state of the target computing node; or
third field information for recording a computing service state of the target computing node.

A method for transmission of a computing power announcement is further provided in the embodiments of the disclosure, which is performed by a second computing network element node. The method includes:
receiving computing power announcement information of a target computing node sent by a first computing network element node;
in which the computing power announcement information includes at least one of:
first field information for recording computing service capability information of the target computing node;
second field information for recording a computing resource state of the target computing node; or
third field information for recording a computing service state of the target computing node.

A computing network element node is further provided in the embodiments of the disclosure. The computing network element node is a first computing network element node, and the computing network element node includes a transceiver configured to:
send computing power announcement information of a target computing node to a second computing network element node;
in which the computing power announcement information includes at least one of:
first field information for recording computing service capability information of the target computing node;
second field information for recording a computing resource state of the target computing node; or
third field information for recording a computing service state of the target computing node.

DETAILED DESCRIPTION

The embodiments of the disclosure will be described in more detail below with reference to the accompanying drawings. Although the embodiments of the disclosure are shown in the drawings, it should be understood that the disclosure may be implemented in various forms and should not be limited by the embodiments set forth herein. Rather, the embodiments are provided for a thorough understanding of the disclosure and may fully convey the scope of the disclosure to those skilled in the art.

The terms such as "first", "second" or similar used in the description and the claims are only used to distinguish similar objects, rather than describe a specific order or a precedence order. It should be understood that the data used herein may be interchanged where appropriate so that the embodiments of the disclosure described herein may be implemented in an order other than those illustrated or described herein. In addition, terms "include" and "have" and their any variations are intended to cover non-exclusive inclusions. For example, a process, method, system, product, or device, containing a series of steps or units is not limited to the listed steps or units, but may further include steps or units not listed inherent to such process, method, product or device. The term "and/or" in the description and the claims represents at least one of connected objects.

The following description provides examples and does not limit the scope, applicability, or configuration set forth in the claims. Changes may be made to functions and arrangements of the elements discussed without departing from the scope of the disclosure. Various examples may be properly omitted, replaced, or added with various procedures or components. For example, the described methods may be executed in a different order than those described, and various steps may be added, omitted, or combined. In addition, features described with reference to certain examples may be combined in other examples.

In order to help understand related solutions of the embodiments of the disclosure better, the following describes a system to which the method for transmission of the computing power announcement is applied according to the embodiments of the disclosure, and the concepts related thereto.

Figure 1:
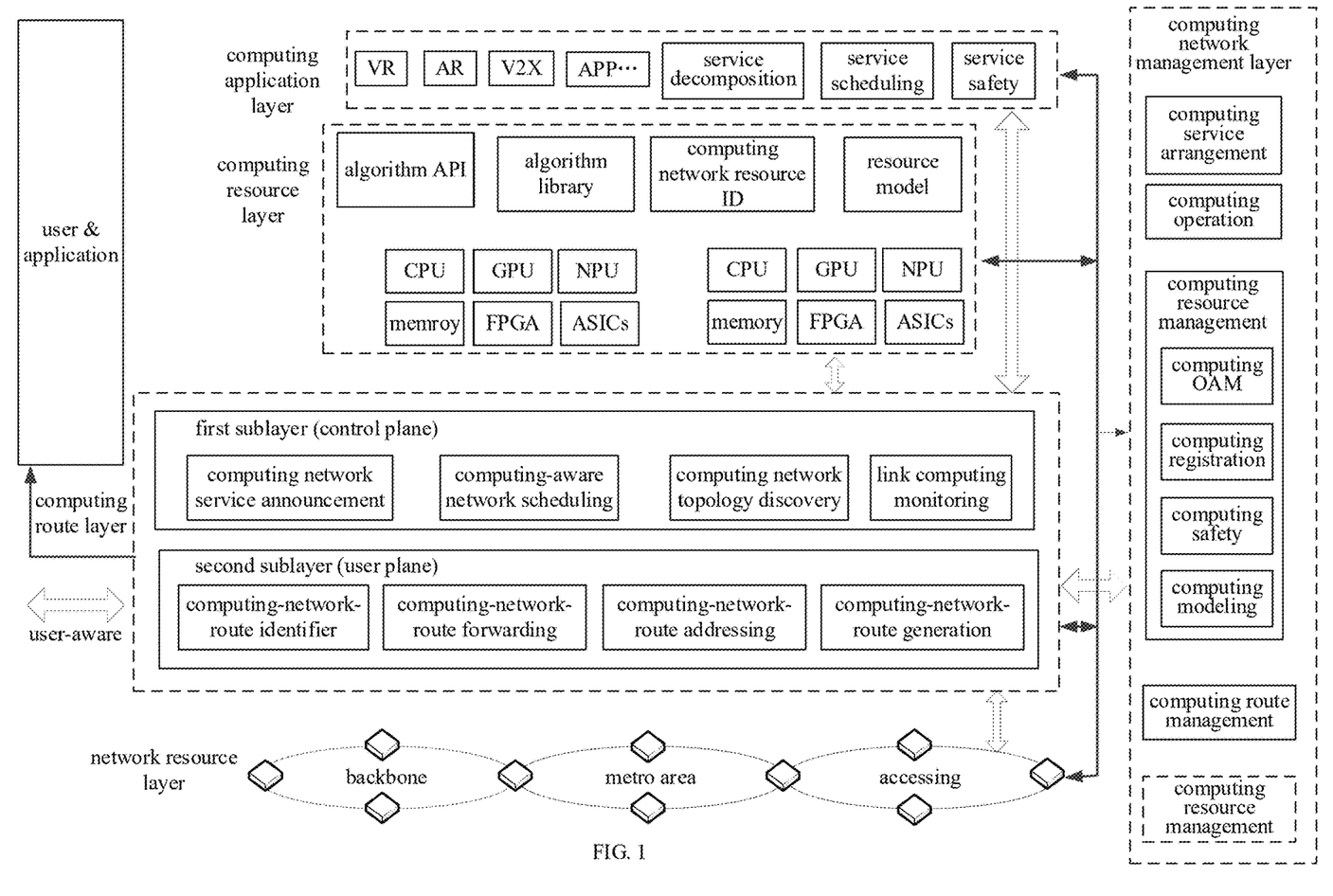
FIG. 1 is a structural diagram illustrating an implementation of a network system for computing power processing to which a method for transmission of a computing power announcement is applied according to an embodiment of the disclosure.

The method for transmission of the computing power announcement according to the embodiments of the disclosure is applied to a network system for computing power processing, which may be referred to as a computing-aware network (CAN), a computing power network (CPN), a computing integration network, a new network fused with a computing network, etc. In an implementation, as illustrated in FIG. 1, the network system for computing power processing may include:

a computing route layer;
a computing resource layer;
a network resource layer;
a computing network management layer; and
a computing service layer.

In addition to the above structure including the computing route layer, the computing resource layer, the network resource layer, the computing network management layer, and the computing service layer, the network system in another implementation may further be a structure including a computing network management layer, a computing application layer, a computing route layer, a computing resource layer, and a network resource layer. Alternatively, the network system may be a structure including a computing service layer, a computing platform layer, a computing resource layer, a computing route layer and a network resource layer. The specific structure of the network system is not limited to the structure illustrated in FIG. 1.

It should be noted that, in the embodiments of the disclosure, the computing network element node refers to a network device with a computing power. The computing network element node may further include a computing route node and a computing power node (which is sometimes referred to as a computing node). The computing route node that may be located on the computing route layer of the network system for computing power processing, is a network device for transmitting the announcement of the computing resource information in the network system for computing power processing.

The computing node, located on the computing resource layer and/or the network resource layer, refers to a device having a computing capability, which is configured to provide computing resources, and corresponds to a device for processing a computing task in the network system for computing power processing, such as a server device in a data center and an all-in-one machine. In addition, the computing node in the embodiments of the disclosure may further be a computing network element device. The computing network element device is a network transmission device at the network resource layer, such as a router, and the computing network element device may further provide both a computing resource and a computing service.

In the network system for computing power processing in the related art, computing power announcement information is transmitted between the computing route layer and the computing resource layer, and all computing power information (including computing resource information and computing service information) is announced together. As such, different protocols and modes cannot be adaptively selected for announcement in the network, thereby resulting in a large amount of announcement overheads in the network. In order to solve the technical problem, a method for transmission of the computing power announcement is provided in the embodiments of the disclosure. The computing power announcement information is classified based on the content of the computing power announcement and the required sending frequency, and for different types of computing power announcement information, different computing power announcement protocols and announcement strategies are selected, to reduce the unnecessary signaling overheads and improve the transmission efficiency of sending the computing power announcement.

Figure 2:
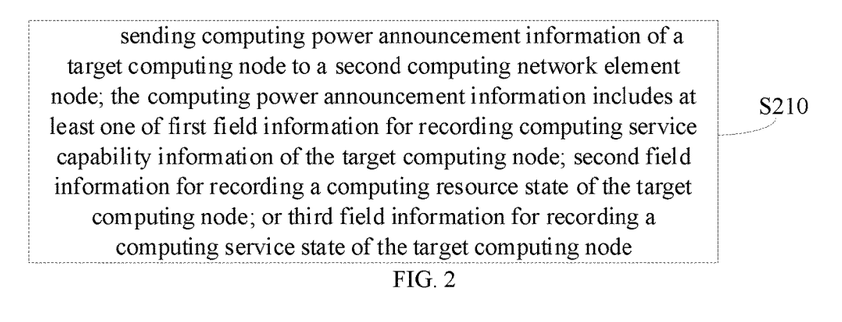
FIG. 2 is a flowchart illustrating a method for transmission of a computing power announcement according to an embodiment of the disclosure.

Optionally, in an implementation, a method for transmission of a computing power announcement is provided in the embodiments of the disclosure, which is applied to a first computing network element node. As illustrated in FIG. 2, the method includes following steps.

At S210, computing power announcement information of a target computing node is sent to a second computing network element node.

The computing power announcement information includes at least one of:
first field information for recording computing service capability information of the target computing node;
second field information for recording a computing resource state of the target computing node; or
third field information for recording a computing service state of the target computing node.

It needs to be noted that, in the embodiments of the disclosure, each of the first computing network element node and the second computing network element node may be one of the computing route node or the computing node.

Optionally, each of the first computing network element node and the second computing network element node may be any one of the computing route node or the computing node in a computing service transmission.

Optionally, a target computing node is one of the computing nodes in the process of the computing service transmission, and the computing power announcement information of the target computing node is transmitted among a plurality of computing network element nodes in the network system for computing power processing, where the first computing network element node and the second computing network element node may be two transmission nodes in the process of the computing service transmission.

According to the method for transmission of the computing power announcement in the embodiments of the disclosure, the computing power announcement information is divided into a plurality of different types, and optionally, may include:

computing service capability information;
a computing resource state; and
a computing service state.

In some embodiments, the computing power announcement information including the computing service capability information is configured to generate a computing power topology and a computing service topology. Optionally, a registration process for the computing node is configured to announce a computing resource and an initialization deployment situation of the computing service. Optionally, the computing service capability information may include computing enabling information of the computing node and/or initialization deployment information of the computing service.

The computing power announcement information including the computing resource state is configured for an announcement in a basic resource service request mode, and the announcement protocol and the announcement strategy specifically for the computing resource state announcement may be adaptively adjusted. In an optional implementation of the embodiments of the disclosure, the computing resource state includes at least one of a central processing unit (CPU)/a graphics processing unit (GPU), a computing deployment pattern or a computing deployment position.

The computing power announcement information including the computing service state is configured for an announcement in a computing service mode, and the announcement protocol and the announcement strategy specifically for the computing service state announcement may be adaptively adjusted. In an optional implementation of the embodiments of the disclosure, the computing service state includes at least one of a service ID, a number of service connections, or a service duration.

By adopting the method for transmission of the computing power announcement in the embodiments of the disclosure, the computing power announcement information is divided into a plurality of different types, and each type of computing power announcement information is sent based on its corresponding announcement protocol and announcement strategy, so that the sent computing power announcement information may include at least one of:

first field information for recording computing service capability information of the target computing node;
second field information for recording a computing resource state of the target computing node; or
third field information for recording a computing service state of the target computing node.

Optionally, at step S210, sending the computing power announcement information includes:

sending the computing power announcement information via an extended border gateway protocol (BGP);
each of the first field information, the second field information and the third field information is one piece of field information in the extended BGP message.

By adopting the method for transmission of the computing power announcement in the embodiments of the disclosure, for the manner that the computing power announcement information may be divided into a plurality of different types for respective announcement, a plurality of computing power information announcement protocols may be designed, and different computing power announcement information is sent based on different computing power information announcement protocols. That is, different field information in the computing power announcement information is used for sending different computing power announcement contents.

In the embodiments of the disclosure, optionally, computing power announcement information is carried via an extended network protocol. For example, the computing power announcement information is sent based on a computing power announcement protocol extended based on a BGP/an interior gateway protocol (IGP).

In an optional implementation, computing service capability information is carried by using an extended field in the extended BGP message, and is configured to announce a computing resource and an initialization deployment state for a computing service. That is, in the embodiments of the disclosure, the first field information for recording computing service capability information of the target computing node may be one piece of field information in the extended BGP message.

Figure 3:
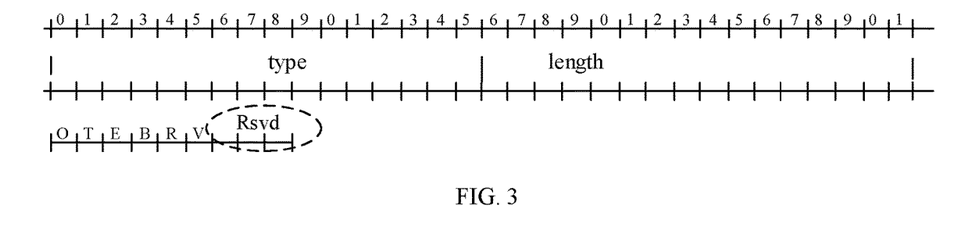
FIG. 3 is a diagram illustrating an extended BGP message for sending computing power announcement information according to an embodiment of the disclosure.

It should be noted that, generation of the computing service topology includes two steps. The first step is to generate service topology information. Optionally, the service topology information includes service ID information and position information of service deployment. Optionally, the computing node announces the deployed service ID information such as service ID information, which may be announced based on a BGP link-state (BGP-LS) and a dynamic host configuration protocol (DHCP). Optionally, the computing service capability information may be carried by the extended BGP-LS. The computing service deployment information of each computing node is identified, the computing service information (such as service ID information) may be added to a node attribute field, and the computing service topology is established in advance by announcement between the nodes. FIG. 3 is a diagram illustrating a BGP node flag field, in which the field "Rsvd" may be used to identify the computing service capability information of the computing node.

According to the method for transmission of the computing power announcement in the embodiments of the disclosure, a customized computing power information update protocol is optionally designed based on a specific requirement of the computing power information update. For example, an announcement is made based on a computing resource state and a computing service state. Optionally, the computing resource state and the computing service state may be carried by using a BGP update extension field.

It needs to be noted that, in the transmission method according to the embodiments of the disclosure, corresponding sending protocols are configured respectively based on specific requirements (including update frequency, announcement strategy and the like) of different message contents of the sent computing power announcement information. That is, the computing power announcement information of different message contents is sent via different field information.

In the method for transmission of the computing power announcement according to the embodiments of the disclosure, optionally, the method further includes:

determining a transmission strategy of the computing power announcement information based on a target service to be transmitted and/or the computing power announcement information; and sending the computing power announcement information based on the transmission strategy.

By adopting the transmission method in the embodiments of the disclosure, a self-adaptive transmission strategy is provided based on the service state of the target service to be transmitted and/or the specific announcement content of the computing power announcement information.

The transmission strategy includes:

the computing power announcement information being sent by an active release; or the computing power announcement information being sent based on an obtained computing service request.

Optionally, in the transmission method according to the embodiments of the disclosure, when the target service is a hot spot service, it is determined that the computing power announcement information is sent by the active release; and when the target service is a non-hot spot service, it is determined that the computing power announcement information is sent based on the obtained computing service request.

By adopting the implementation, the target service to be transmitted in the network system for computing power processing may be optionally divided into a hot spot service and a non-hot spot service, and different announcement strategies are adopted for the divided different types of services. Optionally, the computing network element node located in a first hop node during a target service transmission divides the target service transmitted into a hot spot service and a non-hot spot service.

Optionally, for the hot spot service, it is determined that the computing power announcement information is sent by the active release.

In an implementation, when the target service is the hot spot service, sending the computing power announcement information based on the transmission strategy includes:

sending the computing power announcement information to the second computing power network element node located within a target announcement domain;

in which the target announcement domain includes a target geographic location range and/or a target service deployment area.

Figure 4:
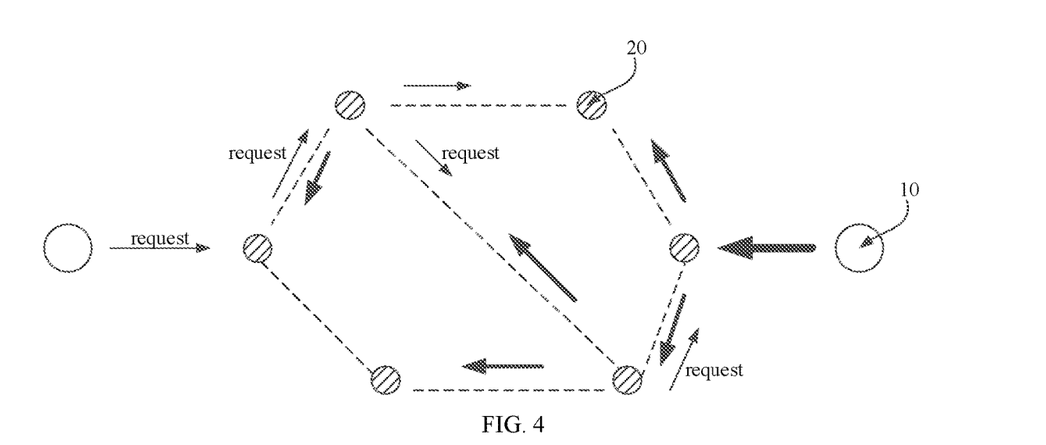
FIG. 4 is a diagram illustrating transmission used in a hot spot service according to an embodiment of the disclosure.

Specifically, when the target service is the hot spot service, a computing network element node (which may be a computing node or a computing route node) is required to actively release computing power announcement information, and the computing power announcement information is not announced across the whole network but announced within a local announcement range for the hot sport area. As illustrated in FIG. 4, by adopting the implementation, a computing service provider 10 actively sends computing power announcement information to each computing network element node 20 (for example, a route node), and the computing power announcement information is transmitted between a plurality of computing network element nodes 20.

In an implementation, in the method for dividing the target announcement domain (that is, an announcement range), an adjacent domain may be identified as one announcement domain based on a geographic location, and state information of the service may be announced within the range (i.e., the computing power announcement information is sent to the computing network element node located within the target geographic location range based on the transmission strategy with a dimension being the geographic location). In another implementation, the area having the same service deployment may be divided into the same announcement domain based on a dimension being the service. By using the implementation, for the transmitted target service, the computing power announcement information is sent to the computing network element node located within the target service deployment area based on the determined transmission strategy with a dimension being the service.

In terms of a dimension being the geographical location, an announcement relationship between announcement domains may be optionally determined based on an existing autonomous system (AS) domain division in an Internet protocol (IP).

By adopting the transmission method according to the embodiments of the disclosure, optionally, for a non-hot spot service, it is determined that the computing power announcement information is sent based on the obtained computing service request. That is, specifically, the computing power announcement information is sent by using a passive computing request, and the computing power announcement information is not broadcast across the whole network, to reduce the signaling overheads of the computing power announcement.

Figure 5:
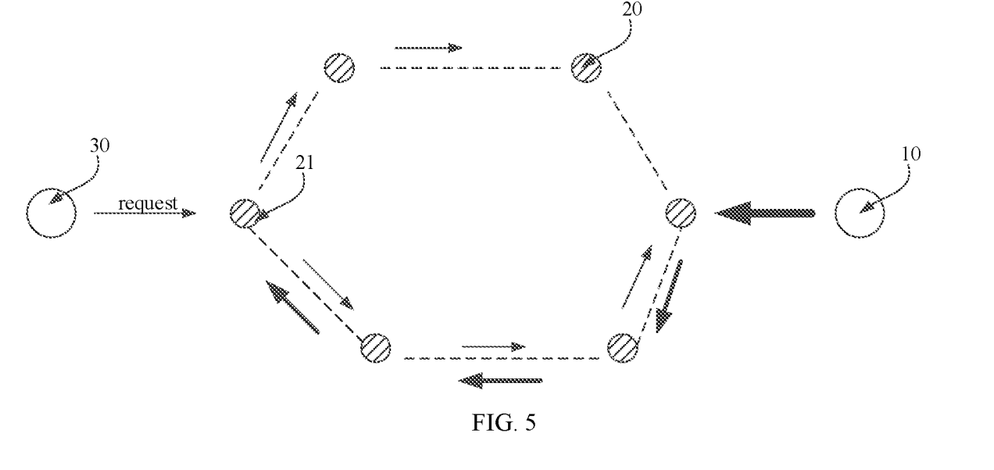
FIG. 5 is a diagram illustrating transmission used in a non-hot spot service according to an embodiment of the disclosure.

Specifically, as illustrated in FIG. 5, by adopting the implementation, a computing service message end 30 (such as a terminal) first needs to send a computing service request, a first computing network element node 21 (i.e., a first hop node) of the computing route continues to send the computing service request to one or more computing network element nodes that deploy corresponding services and computing powers after receiving the computing service request, and a computing service provider 10 feeds back computing power announcement information based on the received computing service request. Optionally, the fed-back computing power announcement information may include a computing resource state and/or a computing service state.

By adopting the transmission method in the embodiments of the disclosure, the computing power announcement information is classified based on the content of the computing power announcement and the required sending frequency, and for different types of computing power announcement information, different computing power announcement protocols and announcement strategies are selected, to avoid the unnecessary signaling overheads and provide fast convergence of the route. Optionally, based on a multi-dimensional resource aware state, resource cooperative scheduling of the computing network enables the service to be scheduled to an optimal destination node through an optimal path, which improves a resource utilization rate of an operator network while ensuring the best user experience.

Figure 6:
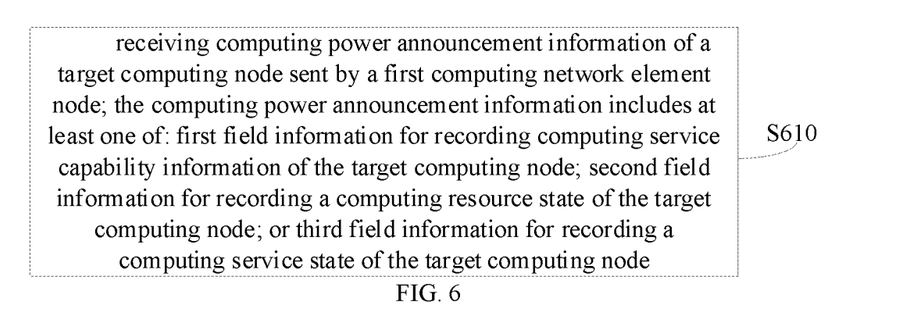
FIG. 6 is a flowchart illustrating a method for transmission of a computing power announcement according to another embodiment of the disclosure.

A method for transmission of a computing power announcement is further provided in another embodiment of the disclosure, which is applied to a second computing network element node. As illustrated in FIG. 6, the method includes following steps.

At S610, computing power announcement information of a target computing power node sent by a first computing power network element node is received.

The computing power announcement information includes at least one of:
    first field information for recording computing service capability information of the target computing node;
    second field information for recording a computing resource state of the target computing power node; or
    third field information for recording a computing service state of the target computing power node.

In the embodiments of the disclosure, each of the first computing network element node and the second computing network element node may be one of the computing route node and the computing node, and optionally, each of the first computing network element node and the second computing network element node may be any one of the computing route node or the computing node in the computing service transmission.

Optionally, the target computing node is one of the computing nodes in the process of the computing power service transmission, and the computing power announcement information of the target computing node is transmitted among a plurality of computing network element nodes in the network system for computing power processing, and the first computing network element node and the second computing network element node may be two transmission nodes in the process of the computing service transmission.

According to the method for transmission of the computing power announcement in the embodiments of the disclosure, computing power announcement information is classified based on the content of the computing power announcement and the required sending frequency, and for different types of computing power announcement information, different computing power announcement protocols and announcement strategies are selected, to reduce the unnecessary signaling overheads and improve the transmission efficiency of sending the computing power announcement.

Optionally, in the transmission method, receiving the computing power announcement information of the target computing node sent by the first computing network element node includes:
    receiving the computing power announcement information actively sent by the first computing network element node.

Optionally, in the transmission method, receiving the computing power announcement information of the target computing node sent by the first computing network element node includes:
    sending a second computing service request to the first computing network element node after receiving a first computing service request sent by a client; and
    receiving the computing power announcement information sent by the first computing network element node in response to the second computing service request.

Optionally, in the transmission method, the second computing network element node is located within a target announcement domain of the first computing network element node;
    in which the target announcement domain includes a target geographic location range and/or a target service deployment area.

Optionally, in the transmission method, receiving the computing power announcement information includes:
    receiving the computing power announcement information via an extended BGP message;
    in which each of the first field information, the second field information and the third field information is one piece of field information in the extended BGP message.

Figure 7:
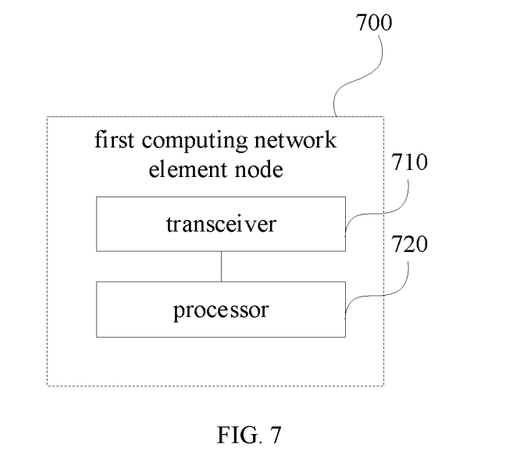
FIG. 7 is a structural diagram illustrating a computing network element node according to an implementation of the embodiments of the disclosure.

A computing network element node is further provided in the embodiments of the disclosure. The computing network element node is a first computing network element node. As illustrated in FIG. 7, the first computing network element node 700 includes a transceiver 710 and a processor 720. The transceiver 710 is configured to:
    send computing power announcement information of a target computing node to a second computing network element node.

The computing power announcement information includes at least one of:
    first field information for recording computing service capability information of the target computing node;
    second field information for recording a computing resource state of the target computing node; or
    third field information for recording a computing service state of the target computing node.

Optionally, for the computing network element node, the processor 720 is configured to:
    determine a transmission strategy of the computing power announcement information based on a target service to be transmitted and/or the computing power announcement information; and
    send the computing power announcement information based on the transmission strategy.

Optionally, for the computing network element node, the transmission strategy includes:
    the computing power announcement information being sent by an active release; or
    the computing power announcement information being sent based on an obtained computing service request.

Optionally, for the computing network element node, when the target service is a hot spot service, the processor 720 determines that the computing power announcement information is sent by the active release; and
    when the target service is a non-hot spot service, the processor 720 determines that the computing power announcement information is sent based on the obtained computing service request.

Optionally, for the computing network element node, when the target service is the hot spot service, the processor 720 sends the computing power announcement information based on the transmission strategy, including:
    sending the computing power announcement information to the second computing network element node located within a target announcement domain;
    in which the target announcement domain includes a target geographic location range and/or a target service deployment area.

Optionally, for the computing network element node, the transceiver 710 sends the computing power announcement information, including:
    sending the computing power announcement information via an extended BGP message;
    in which each of the first field information, the second field information and the third field information is one piece of field information in the extended BGP message.

Figure 8:
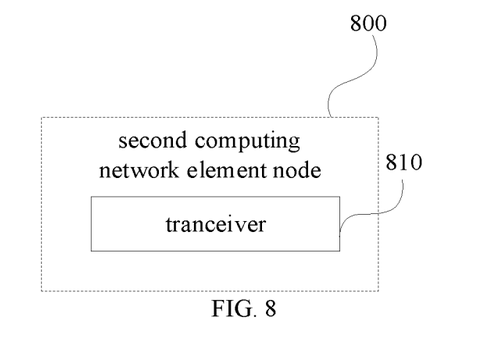
FIG. 8 is a structural diagram illustrating a computing network element node according to another implementation of the embodiments of the disclosure.

A computing network element node is further provided in another embodiment of the disclosure. The computing network element node is a second computing network element node. As illustrated in FIG. 8, the second computing network element node 800 includes a transceiver 810. The transceiver 810 is configured to:

receive computing power announcement information of a target computing node sent by a first computing network element node.

The computing power announcement information includes at least one of:

first field information for recording computing service capability information of the target computing node;

second field information for recording a computing resource state of the target computing node; or third field information for recording a computing service state of the target computing node.

Optionally, for the computing network element node, the transceiver 810 receives the computing power announcement information of the target computing node sent by the first computing network element node, including:

receiving the computing power announcement information actively sent by the first computing network element node.

Optionally, for the computing network element node, the transceiver 810 receives the computing power announcement information of the target computing node sent by the first computing network element node, including:

sending a second computing service request to the first computing network element node after receiving a first computing service request sent by a client; and receiving the computing power announcement information sent by the first computing network element node in response to the second computing service request.

Optionally, for the computing network element node, the second computing network element node is located within a target announcement domain of the first computing network element node;

the target announcement domain includes a target geographic location range and/or a target service deployment area.

Optionally, for the computing network element node, the transceiver 810 receives the computing power announcement information, including:

receiving the computing power announcement information via an extended BGP message;

in which each of the first field information, the second field information and the third field information is one piece of field information in the extended BGP message.

Figure 9:
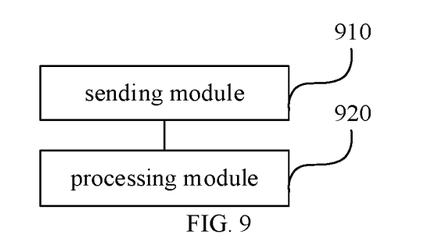
FIG. 9 is a structural diagram illustrating an apparatus for transmission of a computing power announcement according to an implementation of embodiments of the disclosure.

An apparatus for transmission of a computing power announcement is further provided in the embodiments of the disclosure, which is applied to a first computing network element node. As illustrated in FIG. 9, the apparatus includes a sending module 910.

The sending module 910 is configured to send computing power announcement information of a target computing node to a second computing network element node.

The computing power announcement information includes at least one of:

first field information for recording computing service capability information of the target computing node;

second field information for recording a computing resource state of the target computing node; or third field information for recording a computing service state of the target computing node.

Optionally, the transmission apparatus further includes a processing module 920. The processing module 920 is specifically configured to:

determine a transmission strategy of the computing power announcement information based on a target service to be transmitted and/or the computing power announcement information; and send the computing power announcement information based on the transmission strategy.

Optionally, for the transmission apparatus, the transmission strategy includes:

the computing power announcement information being sent by an active release; or the computing power announcement information being sent based on an obtained computing service request.

Optionally, for the transmission apparatus, when the target service is a hot spot service, it is determined that the computing power announcement information is sent by the active release; and when the target service is a non-hot spot service, it is determined that the computing power announcement information is sent based on the obtained computing service request.

Optionally, for the transmission apparatus, when the target service is the hot spot service, the processing module 920 sends the computing power announcement information based on the transmission strategy, including:

sending the computing power announcement information to the second computing network element node located within a target announcement domain;

the target announcement domain includes a target geographic location range and/or a target service deployment area.

Optionally, for the transmission apparatus, the sending module 910 sends the computing power announcement information, including:

sending the computing power announcement information via an extended BGP message;

in which each of the first field information, the second field information and the third field information is one piece of field information in the extended BGP message.

Figure 10:
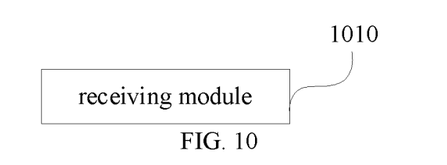
FIG. 10 is a structural diagram illustrating an apparatus for transmission of a computing power announcement according to another implementation of embodiments of the disclosure.

An apparatus for transmission of a computing power announcement is further provided in the embodiments of the disclosure, which is applied to a second computing network element node. As illustrated in FIG. 10, the apparatus includes a receiving module 1010.

The receiving module 1010 is configured to receive computing power announcement information of a target computing node sent by a first computing network element node.

The computing power announcement information includes at least one of:

first field information for recording computing service capability information of the target computing node;

second field information for recording a computing resource state of the target computing node; or third field information for recording a computing service state of the target computing node.

Optionally, for the transmission apparatus, the receiving module 1010 receives the computing power announcement information of the target computing node sent by the first computing network element node, including:

receiving the computing power announcement information actively sent by the first computing network element node.

Optionally, for the transmission apparatus, the receiving module 1010 receives the computing power announcement information of the target computing node sent by the first computing network element node, including:

sending a second computing service request to the first computing network element node after receiving a first computing service request sent by a client; and receiving the computing power announcement information sent by the first computing network element node in response to the second computing service request.

Optionally, for the transmission apparatus, the second computing network element node is located within a target announcement domain of the first computing network element node.

The target announcement domain includes a target geographic location range and/or a target service deployment area.

Optionally, for the transmission apparatus, the receiving module 1010 receives the computing power announcement information, including:

receiving the computing power announcement information via an extended BGP message;

in which each of the first field information, the second field information and the third field information is one piece of field information in the extended BGP message.

A computing network element node is further provided in the embodiments of the disclosure, which includes a processor, a memory and program stored on the memory and executable by the processor. When the program is executed by the processor, any one of the above methods for transmission of the computing power announcement is implemented.

In addition, a readable storage medium having a computer program stored thereon is further provided in the embodiments of the disclosure. When the program is executed by a processor, steps of any one of the above methods for transmission of the computing power announcement are implemented.

Specifically, the computer-readable storage medium is applied to the above terminal, and executes the above-described steps in the corresponding method when applied to the terminal, which will not be repeated here.

In several embodiments according to the disclosure, it is to be understood that the disclosed method and the apparatus may be implemented in other ways. For example, the apparatus embodiments are merely illustrative. For example, the division of units is only a logical function division, but there may be additional division modes during actual implementation. For example, a plurality of units or components may be combined or may be integrated into another system, or some features may be omitted, or not performed. The coupling or direct coupling or communication connection of each other shown or discussed may be an indirect coupling or communication connection via some interfaces, devices, or units, which may be electrical, mechanical or in other forms.

In addition, functional units in the embodiments of the disclosure may be integrated in one processing unit, or may be physically existed separately, or two or more units may be integrated in one unit. The above integrated unit may be implemented in the form of hardware or in the form of hardware and software function unit.

The integration unit implemented in the form of the software function unit may be stored in a computer-readable storage medium. The software function unit is stored in a storage medium including several instructions so that a computer device (which may be a personal computer, a server or a network device, or the like) is caused to perform all or part of steps of the transceiving method in the embodiments of the disclosure. The forgoing storage medium includes a USB disk, a mobile hard disk, a read-only memory (ROM), a random-access memory (RAM), a magnetic disk or an optical disk and other media that may store program codes.

The foregoing are preferred embodiments of the disclosure. It should be noted that, for those skilled in the art, several improvements and amendments may be made without departing from the principles of the disclosure, and these improvements and amendments are also within the protection scope of the disclosure.

What is claimed is:

1. A method for transmission of a computing power announcement, performed by a first computing network element node, the method comprising:

sending computing power announcement information of a target computing node to a second computing network element node;

determining a transmission strategy of computing power announcement information based on a target service to be transmitted and the computing power announcement information; and sending the computing power announcement information based on the transmission strategy;

wherein when the target service is a hot spot service, the transmission strategy is that the computing power announcement information is sent by an active release; when the target service is a non-hot spot service, the transmission strategy is that the computing power announcement information is sent based on a computing service request from the second computing network element node;

wherein the computing power announcement information comprises:

first field information for recording computing service capability information of the target computing node;

second field information for recording a computing resource state of the target computing node; and third field information for recording a computing service state of the target computing node.

2. The method according to claim 1, wherein when the target service is the hot spot service, sending the computing power announcement information based on the transmission strategy comprises:

sending the computing power announcement information to the second computing network element node located within a target announcement domain;

wherein the target announcement domain comprises at least one of a target geographic location range or a target service deployment area.

3. The method according to claim 1, wherein sending the computing power announcement information comprises:

sending the computing power announcement information via an extended border gateway protocol (BGP) message;

wherein each of the first field information, the second field information and the third field information is one piece of field information in the extended BGP message.

4. A computing network element node, comprising: a processor, a memory and a computer program stored on the memory and executable by the processor, wherein when the computer program is executed by the processor, the method for transmission of the computing power announcement according to claim 1 is implemented.

5. A non-transitory readable storage medium storing a program, wherein when the program is executed by a processor, steps of the method for transmission of the computing power announcement according to claim 1 are implemented.

6. A method for transmission of a computing power announcement, performed by a second computing network element node, the method comprising:
   receiving computing power announcement information of a target computing node sent by a first computing network element node;
   wherein the computing power announcement information is sent by the first computing network element node based on a transmission strategy; the transmission strategy is determined based on a target service to be transmitted and the computing power announcement information;
   wherein when the target service is a hot spot service, the transmission strategy is that the computing power announcement information is sent by an active release; when the target service is a non-hot spot service, the transmission strategy is that the computing power announcement information is sent based on a second computing service request from the second computing network element node;
   wherein the computing power announcement information comprises:
   first field information for recording computing service capability information of the target computing node;
   second field information for recording a computing resource state of the target computing node; and
   third field information for recording a computing service state of the target computing node.

7. The method according to claim 6, wherein receiving the computing power announcement information of the target computing node sent by the first computing network element node comprises:
   receiving the computing power announcement information actively sent by the first computing network element node.

8. The method according to claim 6, wherein receiving the computing power announcement information of the target computing node sent by the first computing network element node comprises:
   sending the second computing service request to the first computing network element node after receiving a first computing service request sent by a client; and
   receiving the computing power announcement information sent by the first computing network element node in response to the second computing service request.

9. The method according to claim 7, wherein the second computing network element node is located within a target announcement domain of the first computing network element node;
   wherein the target announcement domain comprises at least one of a target geographic location range or a target service deployment area.

10. The method according to claim 6, wherein receiving the computing power announcement information comprises:
   receiving the computing power announcement information via an extended border gateway protocol (BGP) message;
   wherein each of the first field information, the second field information and the third field information is one piece of field information in the extended BGP message.

11. A computing network element node, wherein the computing network element node is a second computing network element node, and the computing network element node comprises a transceiver configured to perform the method according to claim 6.

12. A computing network element node, wherein the computing network element node is a first computing network element node, and the computing network element node comprises a transceiver configured to:
   send computing power announcement information of a target computing node to a second computing network element node;
   determine a transmission strategy of computing power announcement information based on a target service to be transmitted and the computing power announcement information; and
   send the computing power announcement information based on the transmission strategy;
   wherein when the target service is a hot spot service, the transmission strategy is that the computing power announcement information is sent by an active release; when the target service is a non-hot spot service, the transmission strategy is that the computing power announcement information is sent based on a computing service request from the second computing network element node;
   wherein the computing power announcement information comprises:
   first field information for recording computing service capability information of the target computing node;
   second field information for recording a computing resource state of the target computing node; and
   third field information for recording a computing service state of the target computing node.

13. The computing network element node according to claim 12, wherein when the target service is the hot spot service, sending the computing power announcement information based on the transmission strategy comprises:
   sending the computing power announcement information to the second computing network element node located within a target announcement domain;
   wherein the target announcement domain comprises at least one of a target geographic location range or a target service deployment area.

14. The computing network element node according to claim 12, wherein sending the computing power announcement information comprises:
   sending the computing power announcement information via an extended border gateway protocol (BGP) message;
   wherein each of the first field information, the second field information and the third field information is one piece of field information in the extended BGP message.

\* \* \* \* \*